Patented Mar. 3, 1936

2,033,055

UNITED STATES PATENT OFFICE 2,033,055

PROCESS OF MANUFACTURING ANHYDROUS ALUMINUM CHLORIDE

Ludwig Valik, Long Island City, N. Y., assignor to Givaudan-Delawanna, Inc., New York, N. Y., a corporation of New York No Drawing. Application August 24, 1934, Serial No. 741,207

5 Claims. (Cl. 23—93)

This invention relates to a process of manufacturing anhydrous aluminum chloride from metallic aluminum and chlorine.

Chlorine usually starts to react with aluminum at about 350° C. but as the reaction is highly exothermic the temperature quickly rises to 700° C. and above, making it impossible to control the process.

An alternative process which partly avoids the disadvantage of sudden rise in temperature is to convert the metal into a bromide by reaction with bromine and then replace the bromine in the initial compound with chlorine. This is a typical replacement process.

I have discovered that metallic aluminum, when scratched or otherwise treated to have bright surfaces free of oxide, especially after being treated with organic bromine compounds such as bromoform, bromethylene, etc., reacts very easily, smoothly, and at a lower temperature with chlorine to form aluminum chloride. The preliminary treatment of the metal to facilitate the reaction with chlorine I define herein as activating.

Chemically the metal can be activated in several ways but only the anhydrous method is applicable to my process. Preferably I employ bromoform, which reacts readily, similarly to ordinary etching with scratched metallic aluminum, forming on the surface an easily decomposed organic aluminum complex. The structure of this unidentified compound has its longest axis vertical to the surface of the metal, which is a favorable condition for my process. In this way, after evaporating the bromoform and decomposing the complex, I obtain activated aluminum which is ready to react in a novel manner with chlorine.

The entire surface of the metal activated in this manner is very slightly etched or coated with the unidentified compound which is destroyed under vacuum, leaving the metal in the desired active condition for the chlorine reaction. There is thus a marked distinction between the inorganic bromine replacement process referred to above and my process using an organic bromine compound wherein the surface structure of the metal is changed and rendered capable of combining smoothly with chlorine at relatively low temperatures and under complete control. The cost of the bromoform is negligible as only a small quantity is used up in my process.

The unidentified compound formed on the surface of the metal is completely destroyed by heating in vacuum, after which the vacuum may be disconnected and chlorine passed in. The X-ray method of Dobye and Scherrer shows that this compound has no crystalline structure and consists of very fine fibres which are transparent and pleochroic under illumination. Such compound can also be formed by reacting the metal with bromine and chloroform in one reaction. The resulting aluminum chloride gives on resubliming a chemically pure aluminum chloride of which about 99.9% is sublimable and 0.01% maximum is iron. Its surface is finely divided and most sensitive, giving maximum yields in the Friedel-Crafts synthesis.

*Example 1.*—A rotary drum is charged with 3 kgms. of metallic aluminum. About 100 grms. or more of bromoform are added after which the drum is rotated under vacuum to decompose the formed aluminum-bromide complex. After the decomposition of this complex, the calculated amount of chlorine is passed into the drum.

*Example 2.*—The rotary drum is charged with 3 kgms. of metallic aluminum and a mixture of 15 grms. of bromine and 80 grams chloroform is added thereto. After the aluminum has reacted, any bromoform can be removed and the formed aluminum complex decomposed by means of vacuum and heat, after which the chlorine is passed into the drum.

It is to be understood that only the surface, or part of it, need be first formed into the unstable organic bromine compound and the latter decomposed as stated, since when the chlorine once reacts on the activated metal, the reaction goes to completion on the metal present without any replacement of bromine by chlorine in initially formed aluminum bromide, as in the prior art process.

Among the advantages of my invention over the bromine replacement process may be mentioned the fact that it can be carried out at about normal pressure; the action of bromoform on the metal is far less violent and exothermic than that of bromine; the bromoform attacks a larger surface of the metal than bromine, due to the greater partial pressure of bromine; the replacement process works at much higher total pressure than my process; bromoform is used in small amount and can be recovered more easily than bromine, the vapor phase of which causes considerable difficulty; and aluminum scrap such as oily turnings, borings, etc., can be used far more advantageously in my process since bromoform is an excellent solvent.

The invention claimed is:

1. Process of manufacturing anhydrous aluminum chloride which comprises reacting upon metallic aluminum with bromoform, decomposing the resulting aluminum-bromide complex to leave activated aluminum, and then reacting upon the activated metal with chlorine to convert it into the chloride.

2. Process of manufacturing anhydrous aluminum chloride which comprises reacting upon metallic aluminum with an organic bromine compound, decomposing the resulting aluminum-bromide complex to leave activated aluminum, and then reacting upon the activated metal with chlorine to convert it into the chloride.

3. Process of manufacturing anhydrous aluminum chloride which comprises treating metallic aluminum with a mixture of bromine and chloroform, decomposing the resulting aluminium-bromide complex to leave activated aluminum, and then reacting upon the activated metal with chlorine to convert it into the chloride.

4. Process of manufacturing anhydrous aluminum chloride which comprises treating metallic aluminum with a mixture of bromine and chloroform, heating same under vacuum to decompose the resulting aluminum-bromide complex, and then reacting upon the activated metal with chlorine to convert it into the chloride.

5. Process of manufacturing anhydrous aluminum chloride which comprises reacting upon metallic aluminum with bromoform vapor, decomposing the resulting aluminum-bromide complex to leave activated aluminum, and then reacting upon the activated metal with chlorine to convert it into the chloride.

LUDWIG VALIK.